United States Patent

Gruden et al.

[11] Patent Number: 5,862,903
[45] Date of Patent: Jan. 26, 1999

[54] CENTRIFUGAL CLUTCH FOR POWER DOOR LOCKS

[75] Inventors: James M. Gruden, Centerville; Robert B. Brooks, Jr., Washington Township, both of Ohio

[73] Assignee: ITT Automotive Electrical Systems, inc., Auburn Hills, Mich.

[21] Appl. No.: 349,087

[22] Filed: Dec. 2, 1994

[51] Int. Cl.⁶ ........................................ F16D 23/08
[52] U.S. Cl. .................. 192/105 BB; 192/84.3; 70/276; 292/144; 292/DIG. 23
[58] Field of Search .......................... 192/71, 74, 84 PM, 192/103 B, 105 A, 105 BB; 70/190, 276, 275; 292/142, 144, 199, 201, DIG. 23

[56] References Cited

U.S. PATENT DOCUMENTS

| | | | |
|---|---|---|---|
| 4,520,914 | 6/1985 | Kagiyama et al. | 292/DIG. 23 X |
| 4,625,848 | 12/1986 | Meyers et al. | 292/142 X |
| 4,736,829 | 4/1988 | Noel | 292/DIG. 23 X |
| 4,821,521 | 4/1989 | Schuler | 292/144 X |
| 4,850,466 | 7/1989 | Rogakos et al. | 192/78 |
| 4,926,986 | 5/1990 | Noel | 192/71 X |
| 5,056,633 | 10/1991 | Noel | 192/105 BB X |
| 5,076,623 | 12/1991 | Richards | 292/144 X |
| 5,205,386 | 4/1993 | Goodman et al. | 192/46 |
| 5,441,315 | 8/1995 | Kleefeldt et al. | 292/144 X |

FOREIGN PATENT DOCUMENTS

| | | |
|---|---|---|
| JP55119231 | 9/1980 | European Pat. Off. . |
| 0064942 | 11/1982 | European Pat. Off. . |
| 0233820 | 8/1987 | European Pat. Off. . |
| 0239276 | 9/1989 | Japan .................. 70/275 |
| 0190587 | 7/1990 | Japan .................. 70/275 |
| 1010338 | 4/1983 | Russian Federation ...... 192/84 PM |
| 2218729 | 11/1989 | United Kingdom . |

*Primary Examiner*—Charles A. Marmor
*Assistant Examiner*—Saúl J. Rodríquez
*Attorney, Agent, or Firm*—Gordon Lewis

[57] ABSTRACT

A centrifugal clutch for use with a power door lock actuator. The centrifugal clutch includes an independently rotatable pinion cup having an integral pinion gear which meshes with a jack screw, and a driver rotatably secured to an output shaft of a drive motor. The driver has at least one radially outwardly opening recess formed therein with at least one slider slidably retained within the recess. The slider is biased in a radially inward direction by magnetic lines of force which are provided by a permanent magnet mounted within the driver. Alternatively, a number of sliders can be formed of magnetic material such that the magnetic sliders are mutually attracted to one another in a radially inward direction. A centrifugal force is generated when the driver is rotated. The centrifugal force overcomes the magnetic attractive force to throw the sliders radially outwardly into positive driving engagement with the pinion cup. When the driver is no longer rotatably driven, the centrifugal force is eliminated and the magnetic attractive force then urges the sliders radially inwardly to break the positive driving engagement with the pinion cup.

5 Claims, 4 Drawing Sheets

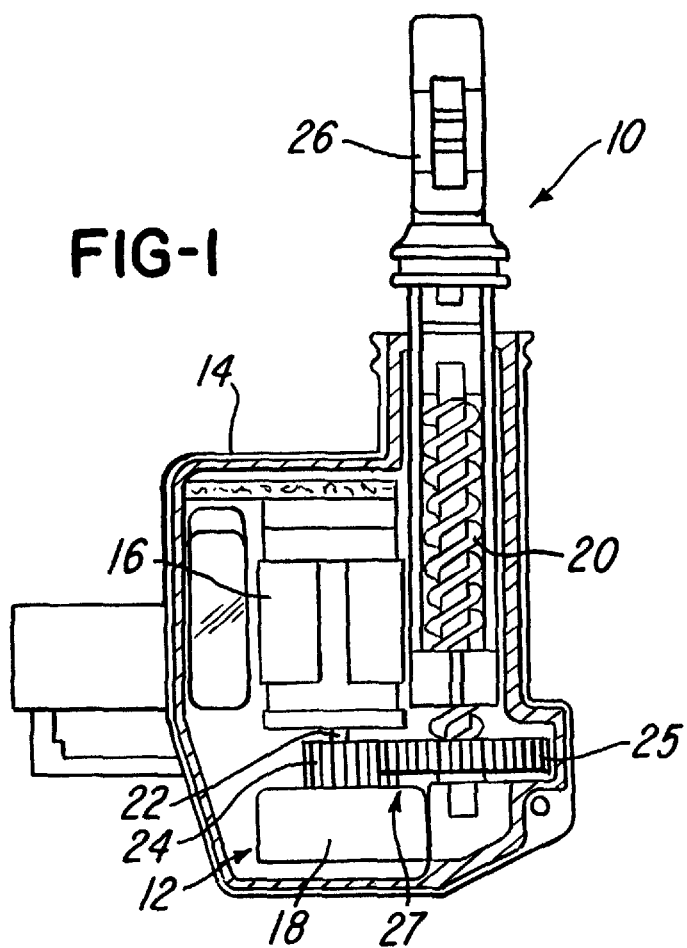
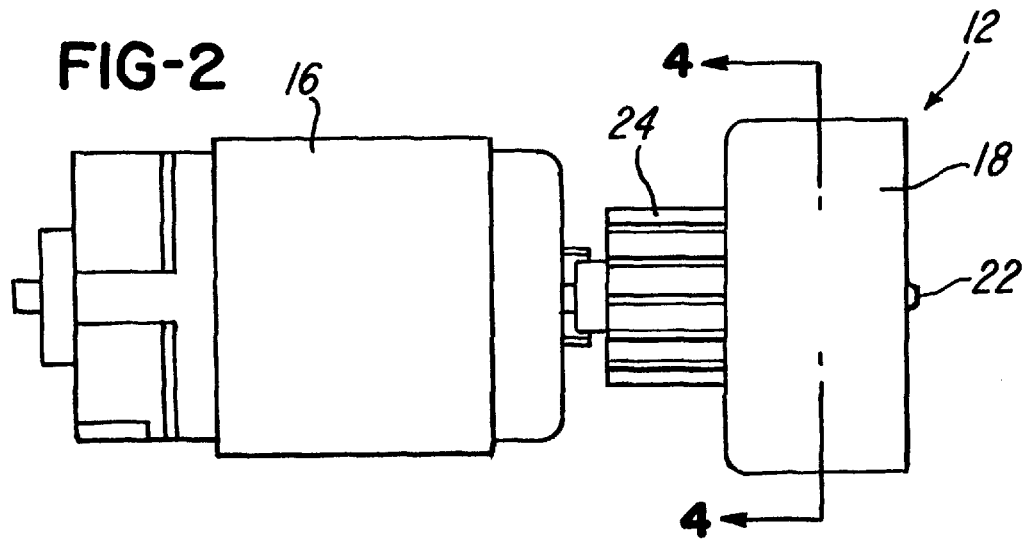

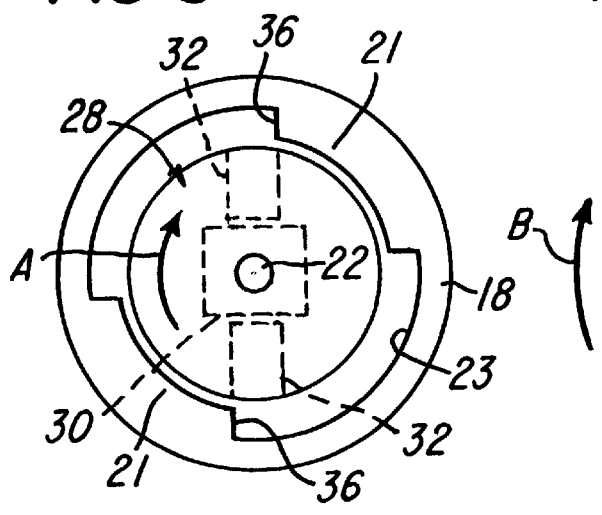
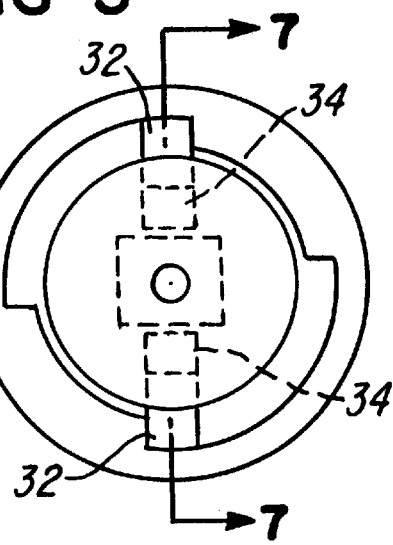
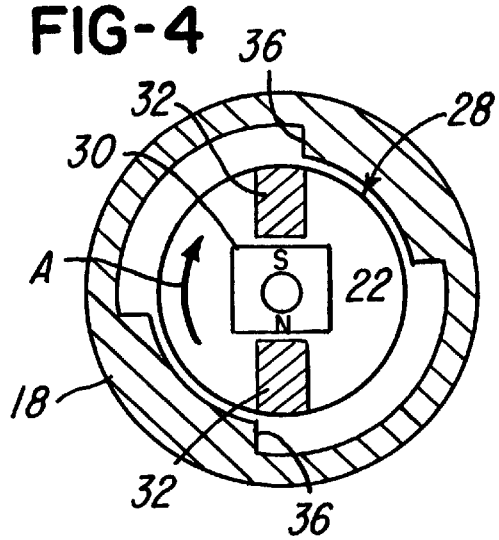
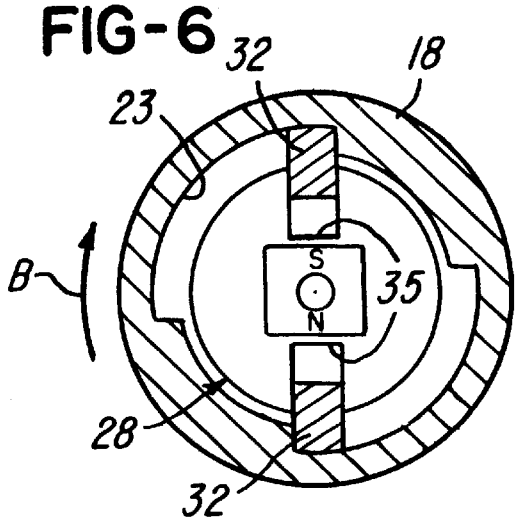
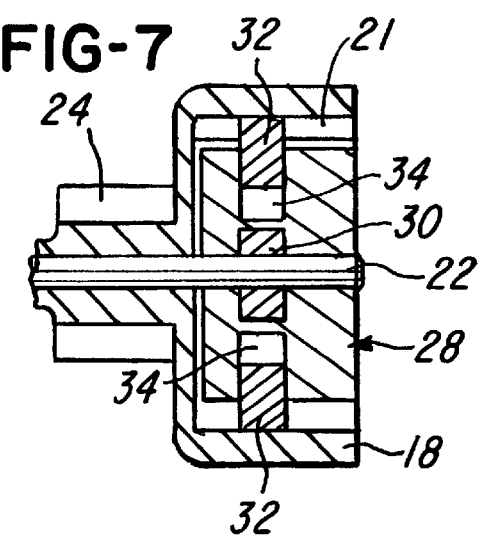

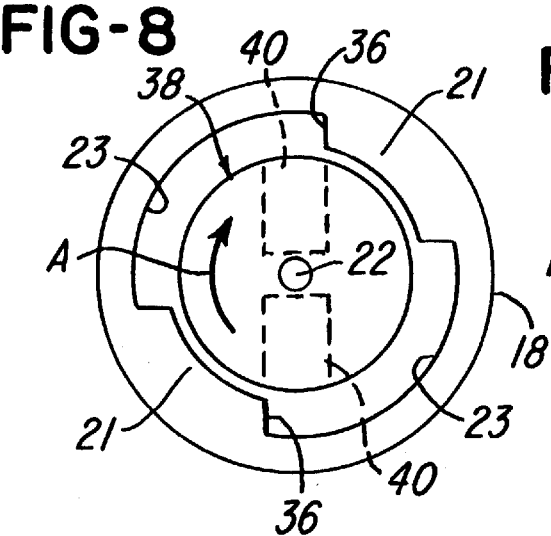
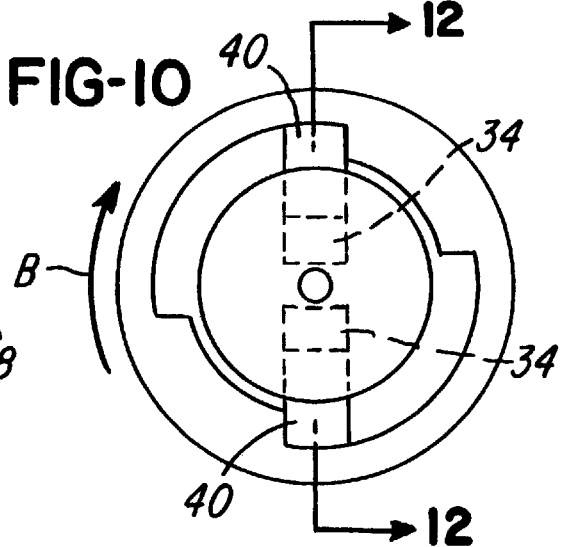
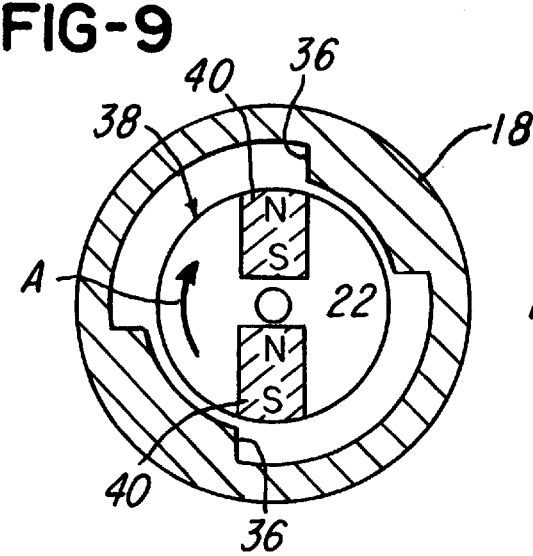
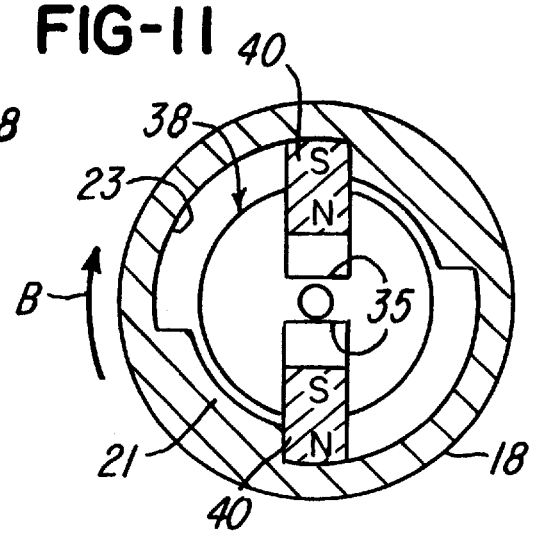
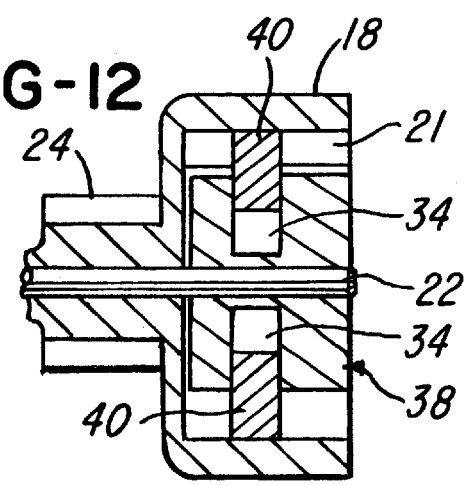

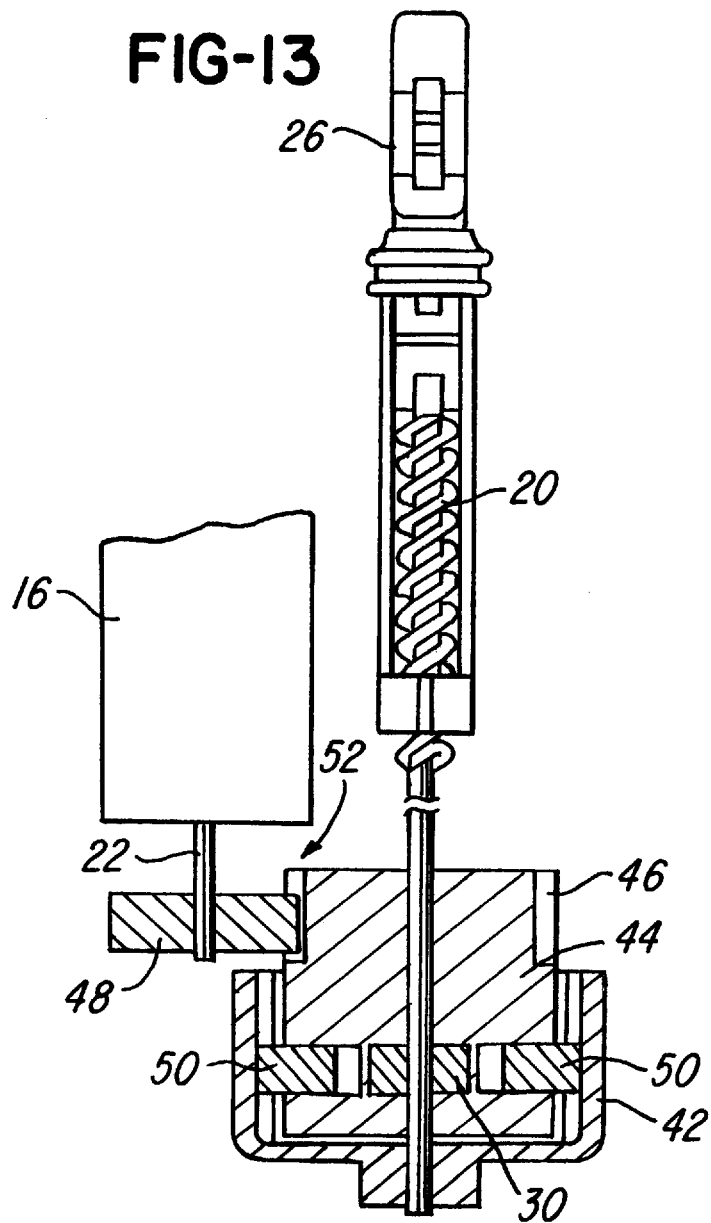

CENTRIFUGAL CLUTCH FOR POWER DOOR LOCKS

FIELD OF THE INVENTION

This invention relates to a clutch for use with a power door lock actuator and, more particularly, to a centrifugal clutch which utilizes at least one permanent magnet to facilitate providing a selective mechanical driving connection between a drive motor and a lift arm.

BACKGROUND OF THE INVENTION

In power door lock operations, a drive motor is utilized to reciprocally drive or shift a lift arm that is connected to a locking lever of a door latch assembly mounted in an automobile door. The lift arm is typically coupled to an output shaft of the drive motor via an intermediate gear train and operates to position the locking lever in either a locked or an unlocked position.

Additionally, the lift arm can be manually driven or shifted by either repositioning a door lock knob or slider, or by use of a door key. Since the gear train and output shaft are directly coupled to the lift arm, manually shifting the lift arm into the locked position requires driving the gear train and the output shaft, and shifting the lift arm into the unlocked position requires backdriving the gear train and the output shaft. In both cases, the drive motor and gear train undesirably offer resistance to being manually driven/backdriven by the door key, or by repositioning the door lock slider. Relatively speaking, the drive motor offers substantially greater resistance to being manually driven/backdriven than the gear train.

The ease with which a lift arm can be manually shifted by use of a door key or door lock slider is referred to as the key effort or reversibility of the power door lock system which is a measure of the amount of resistance provided by the drive motor and gear train when the lift arm is manually shifted. Thus, the greater resistance provided by the gear train and the drive motor, the greater the key effort required to shift the lift arm and the higher the reversibility of the power door lock system.

One solution to the problem of driving/backdriving the motor during manual operation is by use of a clutch interposed between the output shaft of the drive motor and the gear train. The clutch operates to selectively mechanically couple the output shaft of the motor to the lift arm when the motor is activated, such as during a power door lock or unlock operation, and to decouple the output shaft from the lift arm when the motor is deactivated to thereby permit manual shifting of the lift arm without additionally driving/backdriving the motor.

Thus, when the clutch decouples the motor from the lift arm, the key effort required to unlock the car door with a key, or by repositioning the door lock slider is desirably reduced. The key effort is reduced because only the lift arm, jack screw and gear train are driven/backdriven without additionally driving/backdriving the motor.

Centrifugal clutches for use in selectively establishing a mechanical driving connection between the output shaft and the lift arm are known. For example, EP 0 233 820 discloses a centrifugal clutch interposed between a drive motor output shaft and a gear train of a power door lock actuator. The disclosed centrifugal clutch includes numerous parts such as springs which complicate the clutch design, reduce operational reliability of the clutch, complicate the manufacturing and assembly process, and ultimately increase manufacturing and maintenance costs.

What is needed therefore is a simplified centrifugal clutch design which reduces the number of parts for assembly and thereby increases reliability and reduces labor and material costs.

SUMMARY OF THE INVENTION

Thus, it is a primary object of this invention to provide a centrifugal clutch which utilizes at least one permanent magnet to facilitate providing a selective mechanical driving connection.

In one aspect of the invention, a centrifugal clutch for use in a power door lock actuator is provided which includes a rotatable driven member, a rotatable driver spaced apart from the driven member, a centrifugal engagement arrangement which selectively establishes a positive driving connection between the driver and the driven member, and a magnetic decoupling arrangement which selectively magnetically breaks the positive driving connection between the driver and the driven member.

In another aspect of the invention, a power door lock actuator is provided which includes a drive motor having an output shaft, a rotatable screw, an arm threadably engaged with the screw and being linearly movable relative thereto, and a centrifugal clutch interposed between the output shaft and the screw for providing a selective mechanical driving connection between the output shaft and the screw to rotatably drive the arm.

In still another aspect of the invention, a method is provided for selectively connecting a driver to a driven member. The method includes the steps of magnetically biasing an engaging member into a home position associated with the driver with a predetermined magnetic biasing force, and rotating the driver at an angular velocity to generate a centrifugal force which overcomes the predetermined magnetic biasing force so that the engaging member drivingly engages the driven member.

These and other objects and advantages of the invention will be apparent from the following description, the accompanying drawings and the appended claims.

BRIEF DESCRIPTION OF THE DRAWINGS

FIG. 1 is a side view of a power door lock actuator with a portion of the actuator housing removed to illustrate the centrifugal clutch of the present invention;

FIG. 2 is a side view of the centrifugal clutch secured to an output shaft of a drive motor;

FIG. 3 is an end view of the centrifugal clutch showing a driver disengaged from a pinion cup;

FIG. 4 is a sectional view of the centrifugal clutch taken along the line 4—4 of FIG. 2 showing the driver disengaged from the pinion cup;

FIG. 5 is an end view of the centrifugal clutch showing the driver engaged with the pinion cup;

FIG. 6 is a sectional view of the centrifugal clutch similar to FIG. 4 showing the driver engaged with the pinion cup;

FIG. 7 is a sectional view of the centrifugal clutch taken along the line 7—7 of FIG. 5;

FIG. 8 is an end view of a second embodiment of the centrifugal clutch showing a driver disengaged from a pinion cup;

FIG. 9 is a sectional view of the second embodiment of the centrifugal clutch similar to FIG. 4 showing the driver disengaged from the pinion cup;

FIG. 10 is an end view of the second embodiment of the centrifugal clutch showing the driver engaged with the pinion cup;

FIG. 11 is a sectional view of the second embodiment of the centrifugal clutch similar to FIG. 4 showing the driver engaged with the pinion cup;

FIG. 12 is a sectional view of the second embodiment of the centrifugal clutch taken along the line 12—12 of FIG. 10; and FIG. 13 is a partial sectional view of an alternative power door lock actuator arrangement which incorporates the centrifugal clutch of the present invention.

DETAILED DESCRIPTION OF THE PREFERRED EMBODIMENTS

Referring now to FIG. 1, there is shown a power door lock actuator 10 which incorporates the centrifugal clutch 12 of the present invention.

The actuator 10 includes a housing 14 which encloses a drive motor 16, a pinion cup or driven member 18 and a jack screw 20. The pinion cup 18 is retained on a longitudinally extending output shaft 22 of the motor 16, and is freely rotatable relative to the output shaft 22 when the motor 16 is in an inactive state as discussed further below. The pinion cup 18 includes a pinion gear 24 which drivingly meshes with a spur gear 25 integrally formed with, or otherwise secured to the jack screw 20 to reciprocally drive a lift arm 26 threadably engaged with the jack screw 20. The pinion gear 24 and spur gear 25 form an intermediate gear train 27 for coupling the output shaft 22 of motor 16 to the jack screw 20 via the clutch 12 which is interposed between the output shaft 22 and the gear train 27.

The pinion cup 18 also includes at least one circumferentially extending tooth or flange 21 (FIG. 3) which projects radially inwardly from an inner surface 23 of the pinion cup 18. The flange 21 facilitates driving the pinion cup 18 as describe further below.

In the described embodiments, the pinion cup 18, pinion gear 24 and two flanges 21 are integrally molded or formed from a material such as plastic or nylon. Alternatively, the flanges 21 could be staked or glued to the inner surface 23 of the pinion cup 18. The drive motor 16 is preferably a bi-directional permanent magnet DC motor.

The lift arm 26 is attached or coupled to a locking lever (not shown) of a door latch assembly (not shown) mounted within a vehicle door (not shown). The lift arm 26 urges the locking lever into and out of a door-locked position in response to a signal generated by a power door lock/unlock switch (not shown). As discussed further below, the clutch 12 provides a selective mechanical driving connection between the output shaft 22 of the motor 16 and the lift arm 26 when the power door lock/unlock switch is operated.

Referring now to FIGS. 2–7, there is shown a first embodiment of the centrifugal clutch 12 of the present invention. The clutch 12 includes the pinion cup 18, a driver 28 spaced radially inwardly apart from the pinion cup 18, a permanent magnet 30 having a central bore therethrough, and at least one metal slider or bob 32 slidably retained by the driver 28 and centrifugally engageable with the pinion cup 18.

In the embodiment being described, there are two cylindrical metal sliders 32 slidably retained within mutually conforming recesses 34 (FIG. 5) that are spaced approximately 180° apart within the driver 28. The recesses 34 are positioned radially outwardly from, and longitudinally adjacent to the permanent magnet 30 relative to the output shaft 22 (FIG. 7). It should be appreciated that any number of sliders 32 and conforming recesses 34 could be provided in shapes other than cylinders.

The driver 28 can be formed from a substantially non-magnetic metal such as brass, or formed from a plastic material such as acetal resin which exhibits a low coefficient of friction to facilitate a sliding movement of the metal sliders 32 within the recesses 34. One suitable acetal resin is known commercially as DELRIN which is manufactured by DuPont de Nemours, E.I., & Co., Inc., of Wilmington, Del.

In the described embodiment, the permanent magnet 30 is integral with the driver 28 so that the central bore of the magnet 30 serves as a longitudinal axis of the driver 28. The magnet 30 can be insert molded within the driver 28, or can be press fit within a central bore of the driver 28. In either case, the magnet 30 is press fit onto the output shaft 22 of the motor 16 so that the driver 28 is rotatable with the output shaft 22. That is, the driver 28 does not rotate relative to the output shaft 22. The driver 28 retains the pinion cup 18 on the output shaft 22 when the driver 28 is press fit onto the output shaft 22.

The permanent magnet 30 establishes magnetic lines of flux which exert a predetermined magnetic biasing force or field strength which attracts the metal sliders 32 radially inwardly toward the magnet 30, thus retaining the sliders 32 in a home position within the respective recesses 34 during an inactive state of the actuator 10 as shown in FIGS. 3 and 4. In the described embodiment, the magnet 30 is formed from a nylon-bonded hard ferrite material having the following properties: $B_r$=2500–3000 gauss; $H_c$=2200–2350 oersteds; $H_{ci}$=2400–2550 oersteds; tensile strength of 500–700 Kg/cm$^2$; and flexural strength of 1000–1200 Kg/cm$^2$.

A power door lock/unlock operation is accomplished by conventional switching and circuitry (not shown) which activates the drive motor 16 for approximately 500 ms. The driver 28 and sliders 32 are then subjected to angular rotation in the direction of arrow A in FIGS. 3 and 4. As the angular velocity of the rotating sliders 32 increases, the sliders 32 exert an increasing radially outward centrifugal force which opposes the magnetic attractive force generated by the magnet 30. When the angular velocity of the driver 28 exceeds a predetermined level, the centrifugal force exerted by the sliders 32 exceeds the magnetic attractive force generated by the magnet 30 and the centrifugal force urges the sliders 32 radially outwardly into contact with the inner surface 23 of the pinion cup 18 as shown in FIGS. 5–7.

As the driver 28 and extended sliders 32 continue to rotate, the sliders 32 travel circumferentially along the inner surface 23 of the non-rotating pinion cup 18 until the sliders 32 respectively abut or positively engage the trailing edges 36 (FIGS. 3 and 4) of the flanges 21 as shown in FIGS. 5 and 6. The sliders 32 then rotatably drive the pinion cup 18 to establish a positive driving connection between the output shaft 22 and the pinion cup 18 in the direction of arrow B as shown in FIGS. 5 and 6. Since the rotating pinion cup 18 is mechanically coupled to the lift arm 26 via the intermediate gear train 27 and the jack screw 20, a selective mechanical driving connection is established between the output shaft 22 and the lift arm 26.

It takes approximately 80–100 ms for the lift arm 26 to reach an end of travel position at which time a stalled or locked rotor condition occurs and the sliders 32 are subjected to instantaneous angular deceleration. During the locked rotor condition, the drive motor 16 remains energized and the sliders 32 remain radially outwardly extended in binding contact with the flanges 21 as the actuator 10 attempts to drive the lift arm 26 further. The locked rotor condition continues for approximately 400–420 ms at which time the drive motor 16 is de-energized by the conventional switching and circuitry (not shown).

When the motor 16 is de-energized, the actuator 10 relaxes and the sliders 32 are no longer urged into contact with the flanges 21. The magnetic attractive force generated by the magnet 30 then urges the sliders 32 radially inwardly into contact with a closed end surface 35 (FIG. 4b) of the respective recesses 34 and out of contact with the flanges 21 as shown in FIGS. 3 and 4. Thus, the positive driving connection between the output shaft 22 and the pinion cup 18 is broken and the pinion cup 18 is again freely rotatable about the output shaft 22.

With the positive driving connection broken, the key effort required to manually lock/unlock the car door is desirably reduced. The key effort is reduced because only the lift arm 26, jack screw 20 and intermediate gear train 27 are driven/backdriven without having to additionally drive/backdrive the motor 16.

The trailing edges 36 of the flanges 21 define straight end surfaces which tangentially contact the respective cylindrical sliders 32. Alternatively, the trailing edges 36 could define a radial end surface which conforms to the shape of the cylindrical sliders 32 to at least partially circumferentially engage the cylindrical sliders 32. Also, the sliders 32 could be shaped so as to provide at least one straight surface for contacting the straight trailing edges 36 of the flanges 21.

Referring now to FIGS. 8–12, there is shown a second embodiment of the centrifugal clutch 12 of the present invention. The same reference numerals will be utilized to identify structural features common to both embodiments of the centrifugal clutch 12.

The centrifugal clutch 12 includes a driver 38 having a central longitudinal bore therethrough, and a plurality of magnetic sliders or bobs 40 slidably retained within the conforming recesses 34 which are spaced approximately 180° apart. The magnetic sliders 40 are oriented so that the radially inward or mutually adjacent ends thereof have opposing magnetic polarities (i.e. N and S as shown in FIG. 9). Thus, the sliders 40 establish magnetic lines of flux which mutually attract the sliders 40 radially inwardly toward each other to retain the sliders 40 within the recesses 34 of the driver 38 as shown in FIGS. 8 and 9. The magnetic sliders 40 can be formed from the same nylon-bonded hard ferrite material as described above.

The driver 38 can be formed from the same substantially non-magnetic metal or plastic material as described above. In either case, the driver 38 can be directly press fit onto the output shaft 22, or a powdered metal insert or sleeve (not shown) could be inserted within the central bore of the driver 38, or insert molded within the driver 38 and then press fit onto the output shaft 22.

In operation, when the motor 16 is activated, the driver 38 and sliders 40 are subjected to angular rotation which causes an opposing radially outward centrifugal force. When the centrifugal force exerted by the sliders 40 exceeds the magnetic attractive force generated by the sliders 40, the centrifugal force urges the sliders 40 radially outwardly into contact with the inner surface 23 of the pinion cup 18 as shown in FIGS. 10–12. The pinion cup 18 is then rotatably driven in the same manner described above.

As with the first embodiment, it takes approximately 80–100 ms for the lift arm 26 to reach an end of travel at which time a locked or stalled rotor condition occurs and the sliders 40 are subjected to instantaneous angular deceleration. During the locked rotor condition, the drive motor 16 remains energized and the sliders 40 remain radially outwardly extended in binding contact with the flanges 21. The locked rotor condition continues for approximately 400–420 ms at which time the drive motor 16 is de-energized by the conventional switching and circuitry (not shown).

When the motor 16 is de-energized, the actuator 10 relaxes and the sliders 40 are no longer urged into contact with the flanges 21. The magnetic attractive force generated by the sliders 40 then urges the sliders 40 radially inwardly into contact with the closed end surface 35 (FIG. 11) of the respective recesses 34 and out of contact with the flanges 21 as shown in FIGS. 8 and 9. Thus, the positive driving connection between the output shaft 22 and the pinion cup 18 is broken and the pinion cup 18 is again freely rotatable about the output shaft 22.

With the positive driving connection broken, the key effort required to lock/unlock the car door is desirably reduced. The key effort is reduced because only the lift arm 26, jack screw 20 and intermediate gear train 27 are driven/backdriven without having to additionally drive/backdrive the motor 16.

To further reduce the key effort required to manually shift the lift arm, the centrifugal clutch 12 can be interposed between an intermediate gear train 52 and the jack screw 20 as shown in FIG. 13 so that the output shaft 22 of the motor 16 and the gear train 52 are selectively mechanically coupled to the lift arm 26. As shown in FIG. 13, a cup member 42 is rotatably secured to the jack screw 20. A driver 44 is partially concentrically disposed within the cup member 42 and is freely rotatable relative to the jack screw 20. A pinion gear 46 is integrally formed with, or otherwise secured to the driver 44 and is gearingly coupled to the output shaft 22 via a second pinion gear 48 rotatably secured to the output shaft 22. The pinion gears 46 and 48 form the intermediate gear train 52. A plurality of sliders 50 are slidably retained within the driver 44 by either the permanent magnet 30 as described in the first embodiment and as shown in FIG. 13, or by being formed from a magnetic material as described in the second embodiment of the present invention. Thus, only the lift arm 26 and jack screw 20 are driven/backdriven during manual operation without having to additionally drive/backdrive the intermediate gear train 52.

While the forms of the device herein described constitute the preferred embodiments of the invention, it is to be understood that the invention is not limited to these precise forms of device, and that changes may be made therein without departing from the scope of the invention which is defined in the appended claims. For instance, the sliders could pass radially outwardly through circumferentially extending slots in the pinion cup to establish a positive driving connection when the driver is rotated. The radially outward extent of the sliders could be limited by flanged portions thereof which respectively abut a shoulder portion of a stepped recess. Further, the centrifugal clutch of the present invention could be mounted within the actuator in positions other than coaxial with the output shaft 22 or jack screw 20. For example, the clutch 12 could be mounted perpendicular to either output shaft 22 or jack screw 20 and mechanically coupled thereto by a worm gear.

What is claimed is:

1. A centrifugal clutch for use in a power door lock actuator, the clutch comprising:

a rotatable driven member;

a rotatable driver spaced apart from said driven member;

centrifugal engagement means for selectively establishing a positive driving connection between said driver and said driven member; and magnetic decoupling means for selectively magnetically breaking said positive driving connection between said driver and said driven member, wherein said driver includes at least one radially outwardly opening recess and said centrifugal engagement means includes at least one slider slidably retained within said recess, wherein said magnetic decoupling means includes a permanent magnet secured within said driver for magnetically attracting said slider in a direction away from said driven member, and wherein said slider is located between said permanent magnet and said driven member.

2. A centrifugal clutch for use in a power door lock actuator, the clutch comprising:

a rotatable driven member;

a rotatable driver spaced apart from said driven member;

centrifugal engagement means for selectively establishing a positive driving connection between said driver and said driven member; and magnetic decoupling means for selectively magnetically breaking said positive driving connection between said driver and said driven member, wherein said driver includes a plurality of radially outwardly opening recesses and said centrifugal engagement means includes a plurality of sliders slidably retained within said recesses, and wherein said magnetic decoupling means includes a permanent magnet secured within said driver for magnetically attracting said sliders in a direction away from said driven member, and wherein said slider is located between said permanent magnet and said driven member.

3. A power door lock actuator comprising:

a drive motor having an output shaft;

a rotatable screw;

a lift arm threadably engaged with said screw and being linearly movable relative thereto; and a centrifugal clutch interposed between said output shaft and said screw for providing a selective mechanical driving connection between said output shaft and said screw to rotatably drive said lift arm, wherein said centrifugal clutch includes a cup member rotatably secured to said screw, a driver spaced apart from said cup member and freely rotatably retained on said screw and gearingly coupled to said output shaft, and magnetic means for selectively establishing said positive driving connection between said driver and said cup member when said driver is rotated above a predetermined angular velocity.

4. The power door lock actuator claimed in claim 3, wherein said magnetic means includes at least one slider slidably retained by said driver and engageable with said cup member, and a permanent magnet integral with said driver for magnetically urging said slider in a direction away from said cup member when said driver is rotated below said predetermined angular velocity.

5. The power door lock actuator claimed in claim 3, wherein said magnetic means includes a plurality of sliders slidably retained by said driver and engageable with said cup member, said sliders being formed from a magnetic material such that said plurality of sliders are magnetically urged toward each other in a direction away from said cup member when said driver rotated below said predetermined angular velocity.

* * * * *